United States Patent [19]
Thuries

[11] Patent Number: 5,916,397
[45] Date of Patent: Jun. 29, 1999

[54] METHOD OF MANUFACTURING AN INSULATOR MADE OF A COMPOSITE MATERIAL

[75] Inventor: Edmond Thuries, Meyzieu, France

[73] Assignee: Gec Alsthom T & D SA, Paris, France

[21] Appl. No.: 08/664,587

[22] Filed: Jun. 17, 1996

[30] Foreign Application Priority Data

Jun. 20, 1995 [FR] France .................................. 95 07351

[51] Int. Cl.⁶ .................................................. B29C 63/06
[52] U.S. Cl. ............................................. 156/212; 156/51
[58] Field of Search ................................ 156/51, 52, 212, 156/166, 169, 172, 180; 174/137 A, 209, 212, 138 C, 141 C, 140 C, DIG. 8

[56] References Cited

U.S. PATENT DOCUMENTS

| | | |
|---|---|---|
| 4,267,403 | 5/1981 | Pargamin .................................. 174/140 |
| 4,491,687 | 1/1985 | Kaczerginski et al. .................. 174/178 |
| 4,729,053 | 3/1988 | Maier et al. ............................. 361/118 |
| 4,851,955 | 7/1989 | Doone et al. ........................... 361/117 |
| 5,147,984 | 9/1992 | Mazeika et al. ..................... 174/150 X |

FOREIGN PATENT DOCUMENTS

| | | |
|---|---|---|
| 0120787A1 | 10/1984 | European Pat. Off. . |
| 2576655A1 | 8/1986 | France . |
| 2672423A1 | 8/1992 | France . |

*Primary Examiner*—Francis J. Lorin
*Attorney, Agent, or Firm*—Sughrue, Mion, Zinn, Macpeak & Seas PLLC

[57] ABSTRACT

The present invention relates to a method of manufacturing an insulator made of a composite material and including a cylindrical casing provided with annular fins. The method includes the steps of manufacturing an epoxy resin cylinder provided with epoxy resin annular fins covering the resulting cylinder with a covering of a material that withstands the electrical potential gradient under atmospheric conditions.

11 Claims, 3 Drawing Sheets

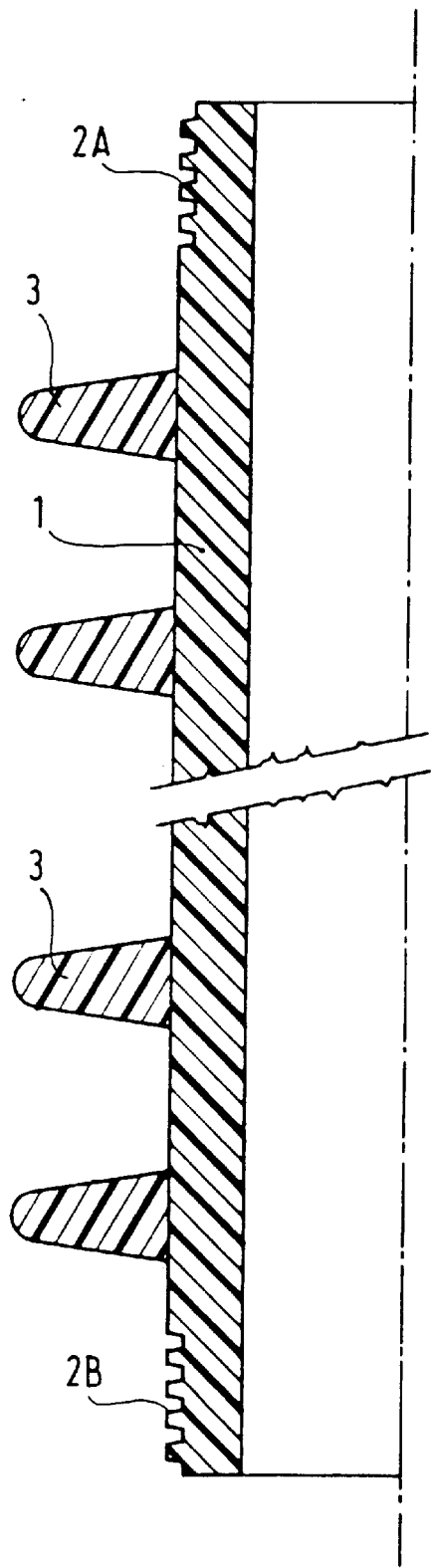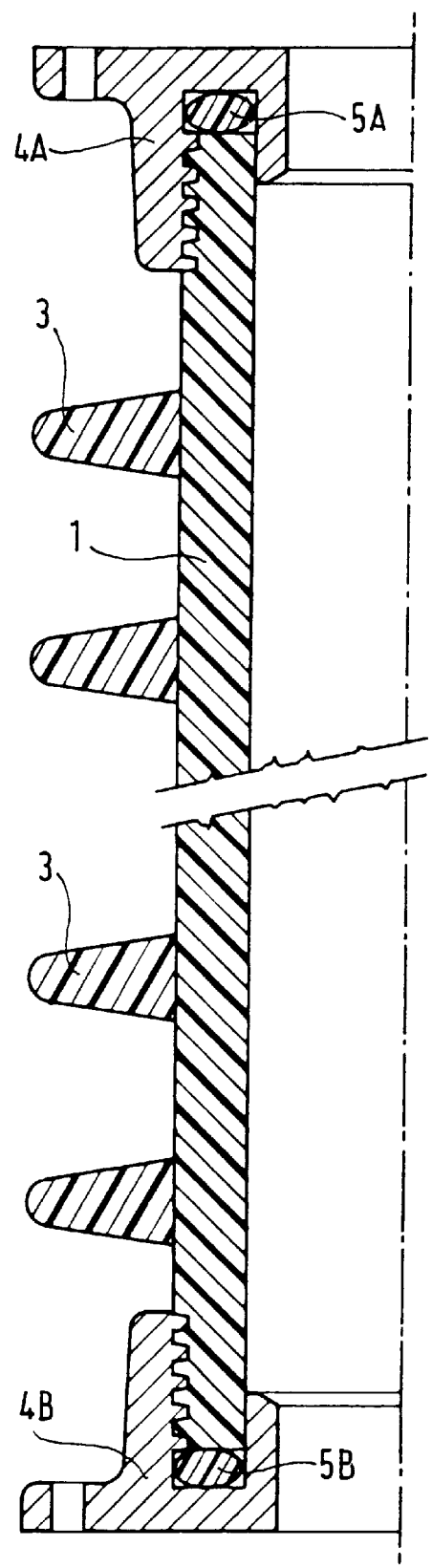

METHOD OF MANUFACTURING AN INSULATOR MADE OF A COMPOSITE MATERIAL

The present invention relates to a method of manufacturing an insulator made of a composite material.

More precisely, it relates to a method of manufacturing an insulator made of a composite material and comprising an epoxy resin cylindrical casing provided with annular fins.

BACKGROUND OF THE INVENTION

The term "insulator" is used to mean any insulating casing designed to contain electrical equipment, such as a circuit-breaker for example.

It is known that such an insulator may comprise a cylindrical casing made of epoxy resin and provided with annular fins made of silicone.

Unfortunately, epoxy resin deteriorates rapidly when it is exposed to atmospheric conditions. Such insulators therefore have particularly limited life spans because they deteriorate rapidly under the effect of inclement weather.

Furthermore, silicone is a particularly expensive material.

OBJECTS AND SUMMARY OF THE INVENTION

In order to solve those problems, the method of the invention comprises the following steps:

manufacturing an epoxy resin cylinder provided with epoxy resin annular fins; and covering the resulting cylinder with a covering of a material that withstands the electrical potential gradient under atmospheric conditions.

The covering material may be silicone or EPDM.

In a first implementation, the cylinder is obtained by molding, a thread being machined at each of its ends, and metal support portions are screwed onto the threads, a respective sealing gasket being interposed between the cylinder and each metal portion.

In a second implementation, the cylinder is obtained by winding a filament or by lamination, with metal support portions being connected to the cylinder by the winding or lamination process.

Preferably, the covering is constituted by a heat-shrinkable silicone sleeve that is longer than the cylinder, and that shrinks when heated so that it intimately covers the cylinder.

The covering may also be overmolded or sprayed onto the cylinder.

Advantageously, an elastomer tube is disposed inside the cylinder, each of its ends being interposed between the cylinder and a respective one of the metal portions.

Preferably, the fins are glued to the cylinder.

The invention also provides an insulating casing made in this way.

BRIEF DESCRIPTION OF THE DRAWINGS

A preferred implementation of the invention is described below in more detail with reference to the accompanying drawings, in which:

FIGS. 1 to 4 show the various steps of a manufacturing method of the invention.

MORE DETAILED DESCRIPTION

In the preferred implementation, the main steps of which are shown in FIGS. 1 to 4, an epoxy resin cylinder 1 is obtained by conventional molding, by laminating fabric, by winding a filament, or the like, each end of the cylinder being machined to obtain a respective thread 2A, 2B, and annular fins 3 made of epoxy resin and preferably obtained by laminating a mat are distributed over the length of the tube 1 and glued thereto.

Support portions, e.g. constituted by metal collars 4A, 4B, are screwed onto the threads 2A, 2B, with respective sealing gaskets 5A, 5B being interposed between each collar and the respective end of the cylinder 1.

The resulting part is inserted into a heat-shrinkable silicone sleeve 6 that is longer than the cylinder.

On applying heat, the sleeve 6 shrinks so that it intimately covers the cylinder 1 and advantageously also intimately covers the metal collars 4A, 4B in part, so as to guarantee that the cylinder 1 remains covered even if the sleeve 6 contracts over time.

Figure 3:
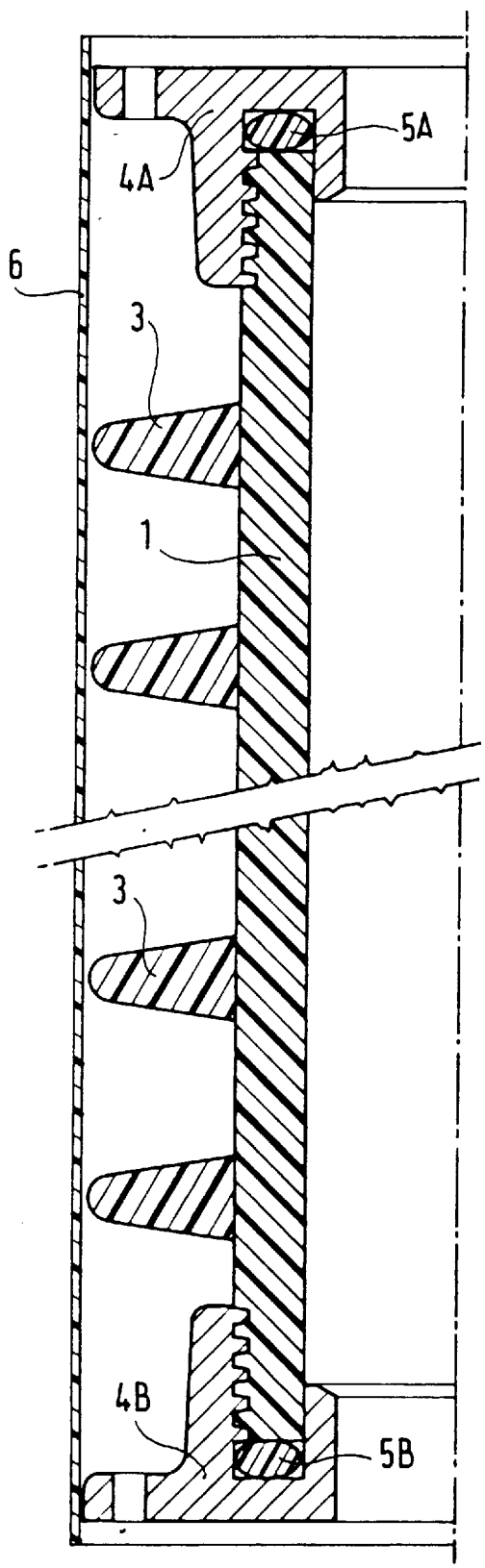
Figure 4:
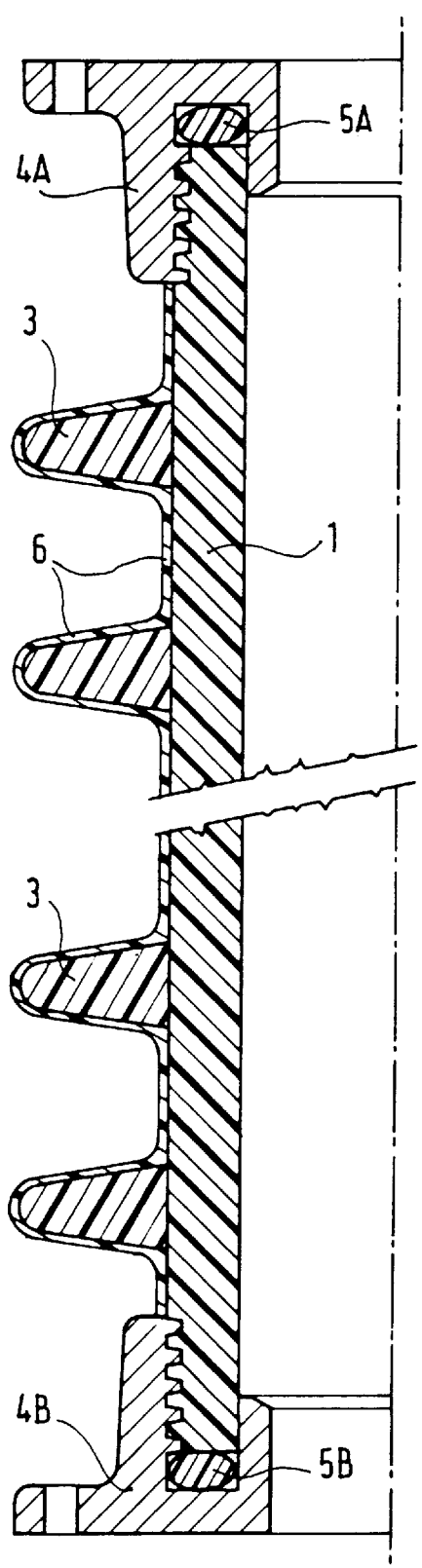
Figure 5:
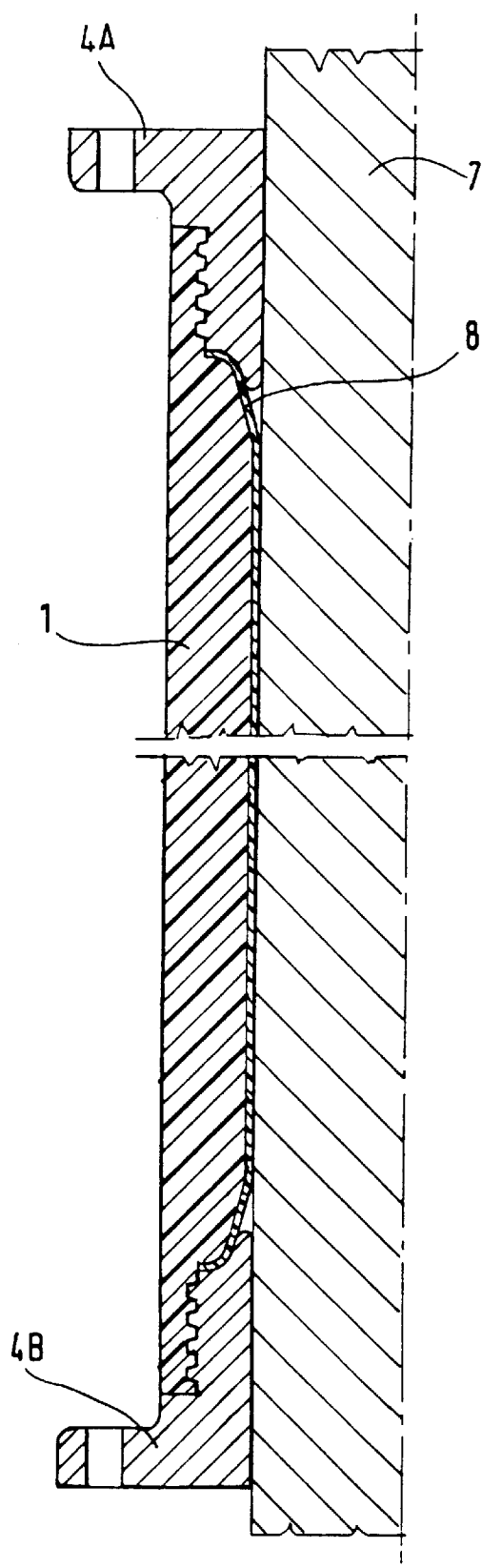
FIG. 5 shows a variant implementation of the invention.

In the variant implementation shown in FIG. 5, the cylinder 1 is obtained by winding a filament or by lamination on a form 7, and the collars 4A, 4B are connected directly to the cylinder by the winding or lamination process.

Advantageously, an elastomer tube 8 for improving sealing is disposed inside the cylinder 1, each of its ends being interposed between the cylinder 1 and a respective collar 4A, 4B.

The silicone sleeve may be merely overmolded or sprayed onto the cylinder 1 instead of using a heat-shrinkable sleeve.

It is also possible to cover the cylinder with EPDM which withstands the electrical potential gradient under atmospheric conditions to an extent comparable with silicone.

I claim:

1. A method of manufacturing an insulator made of a composite material and comprising a cylindrical casing provided with annular fins, said method comprising the following steps:

manufacturing an epoxy resin cylinder provided with epoxy resin annular fins; and covering the resulting cylinder, including said fins, with a covering of a material that withstands the electrical potential gradient under atmospheric conditions.

2. A method according to claim 1, wherein the covering material is silicone.

3. A method according to claim 1, wherein the covering material is EPDM.

4. A method according to claim 1, wherein the cylinder is obtained by molding, a thread being machined at each of its ends, and wherein metal support portions are screwed onto the threads, a respective sealing gasket being interposed between the cylinder and each metal portion.

5. A method according to claim 1, wherein the cylinder is obtained by winding a filament, metal support portions being connected to the cylinder by the winding process.

6. A method according to claim 1, wherein the cylinder is obtained by lamination, metal support portions being connected to the cylinder by the lamination process.

7. A method according to claim 1, wherein the covering is constituted by a heat-shrinkable silicone sleeve that is longer than the cylinder, and that shrinks when heated so that it intimately covers the cylinder.

8. A method according to claim 1, wherein the covering is overmolded onto the cylinder.

9. A method according to claim 1, wherein the covering is sprayed onto the cylinder.

10. A method according to claim 4, wherein an elastomer tube is disposed inside the cylinder, each of its ends being interposed between the cylinder and a respective one of the metal portions.

11. A method according to claim 1, wherein the fins are glued to the cylinder.

* * * * *